United States Patent
Brickman et al.

(10) Patent No.: US 7,502,755 B1
(45) Date of Patent: Mar. 10, 2009

(54) METHOD OF STRUCTURING AND USING A PERFORMANCE-BASED PARTICIPATION CERTIFICATE

(75) Inventors: David M. Brickman, Washington, DC (US); David J. Borsos, McLean, VA (US)

(73) Assignee: Federal Home Loan Mortgage Corporation, McLean, VA (US)

( * ) Notice: Subject to any disclaimer, the term of this patent is extended or adjusted under 35 U.S.C. 154(b) by 627 days.

(21) Appl. No.: 10/825,182

(22) Filed: Apr. 16, 2004

Related U.S. Application Data

(60) Provisional application No. 60/525,889, filed on Dec. 1, 2003.

(51) Int. Cl.
*G06Q 40/00* (2006.01)

(52) U.S. Cl. .................... 705/36; 705/35; 705/36 R

(58) Field of Classification Search .............. 705/36
See application file for complete search history.

(56) References Cited

U.S. PATENT DOCUMENTS 6,336,103 B1 * 1/2002 Baker .................. 705/36 R
2004/0128230 A1 * 7/2004 Oppenheimer et al. ...... 705/38

OTHER PUBLICATIONS

Kling, Arnold S., Get Set for Loan-Level Pricing, Secondary Mortgage Markets. Washington:Jul. 1997. vol. 14, Iss. 2, p. 17-22.*

* cited by examiner

*Primary Examiner*—Kambiz Abdi
*Assistant Examiner*—Shahid R Merchant
(74) *Attorney, Agent, or Firm*—Finnegan, Henderson, Farabow, Garrett & Dunner, LLP

(57) ABSTRACT

A method and computer program product for structuring a credit guarantee contract, comprising identifying a pool of assets, identifying parameters for the assets, identifying a manner of securing a guarantee fee for the credit guarantee contract, issuing a security clearly articulating the parameters of the assets, and resetting the guarantee fee each period based on realized performance of the assets.

25 Claims, 3 Drawing Sheets

US 7,502,755 B1

METHOD OF STRUCTURING AND USING A PERFORMANCE-BASED PARTICIPATION CERTIFICATE

This application claims priority from U.S. Provisional Application Ser. No. 60/525,889 filed Dec. 1, 2003. The entirety of that provisional application is incorporated herein by reference.

BACKGROUND OF THE INVENTION

1. Field of the Invention

The present invention generally relates to financial systems for processing financial information and securing repayment of loans. More particularly, the present invention relates to method for structuring and utilizing mortgage-related financial instruments.

2. Related Art

Borrowers purchasing (single-family or multi-family) homes usually borrow funds from a lender (e.g., a bank, finance company or the like, who are also called "originators" or "lenders"). As is well known in the relevant art(s), the legal document by which the borrower uses the purchased property as security to guarantee repayment of the loan is known as a mortgage (or mortgage loan).

In order to have funds to meet additional demand for mortgages, lenders generate and liberate capital by selling the mortgages they originate into the secondary market, keeping the supply of money for housing more widely available and ultimately lowering costs to borrowers.

The majority of mortgages sold into the secondary market are sold directly or indirectly to the Federal Home Loan Mortgage Corporation ("Freddie Mac") or the Federal National Mortgage Association ("Fannie Mae") (each, an "Agency" or "Government Sponsored Enterprise (GSE)"), or to another market conduit. Often, these entities create securities, which in their most basic form, pass through the borrowers' payments to investors (such securities are referred to as "mortgage-backed pass-through securities") and in the case of the GSE securities, the payments to the investors are guaranteed by the GSE for a fee (the "guarantee fee").

The guarantee fee charged by the GSE in connection with the securities is priced based on the risk profile of the assets backing the security and is determined at the creation of the security. In a multi-family transaction, the risk profile of the assets is normally determined through an underwriting of the individual assets. After the risk profile is attained and the guarantee fee is set, the guarantee fee normally remains constant for the term of the security.

In those cases where the guarantor has been unable to ascertain the risk profile of the assets underlying the security, either due to limited information, insufficient history with the asset or originator, or because it would not be cost effective to underwrite each asset, it has been difficult to effectively price the risk and set a reliable guarantee fee.

To date, no mortgage backed pass through security exists which allows the price to be adjusted based on the performance of the underlying assets after the security has been issued.

Therefore, given the foregoing, what is needed is a method and computer program product for structuring mortgage-backed pass-through securities and using a credit guarantee contract that involves a "guarantee fee" or "premium" that varies with the realized performance of the underlying assets.

DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DESCRIPTION OF THE INVENTION

Overview

Figure 1:
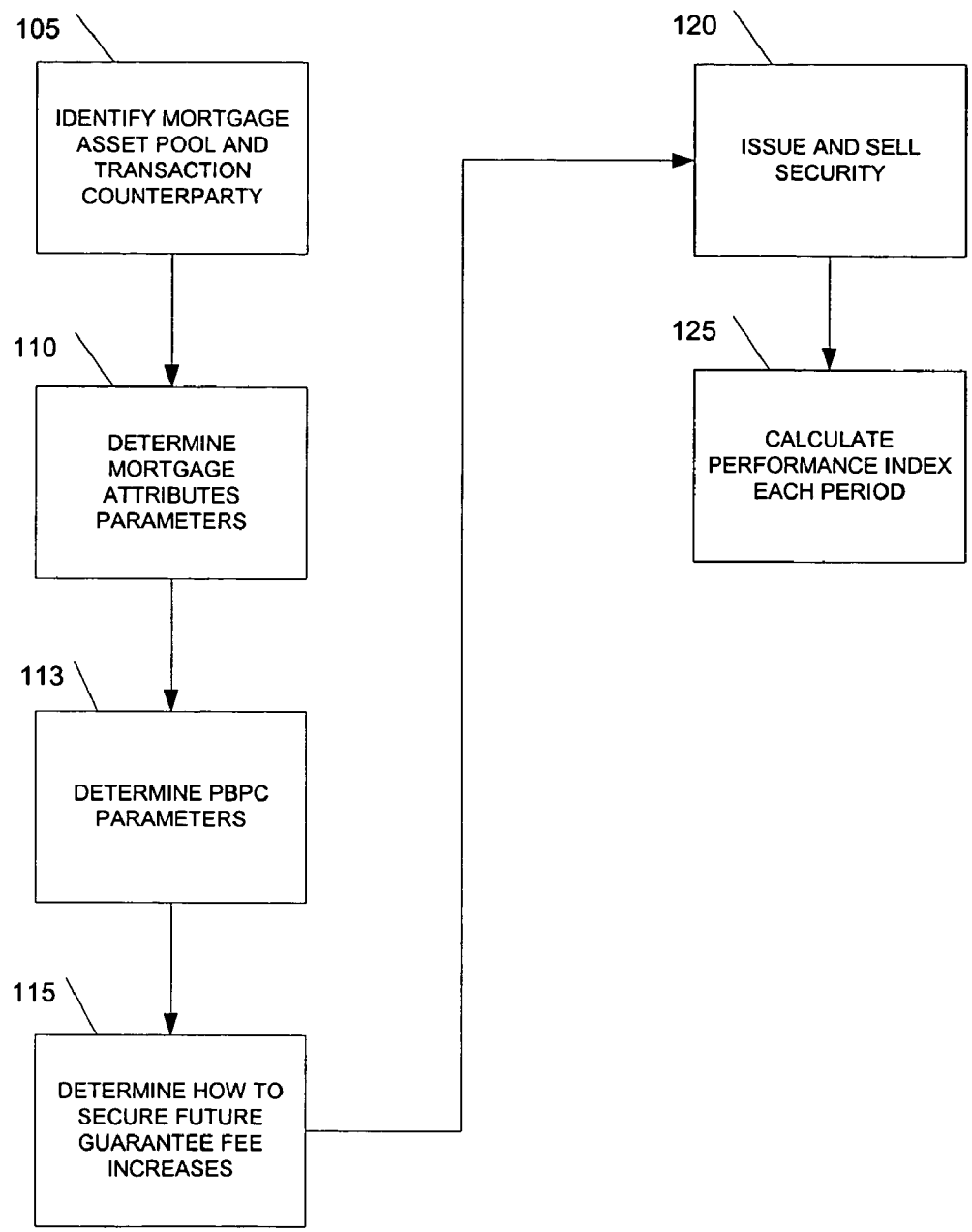
FIG. 1 is a flowchart illustrating a Performance-Based Participation (or Guarantee) Certificate structuring process according to one embodiment of the present invention.

The present invention is directed to a Performance-Based Participation (or Guarantee) Certificate ("PBPC"). The present invention is a credit guarantee contract that involves a "guarantee fee" or "premium" that varies with the realized performance of the underlying assets. In this way, it allows parties to originate a large volume of loans when the risk profile of the underlying assets securing the loans is difficult to assess, either due to limited information, insufficient history, or is simply not individually known. Following origination, the present invention allows the parties to adjust the liability for the credit risk on an ongoing basis based on the realized, actual performance of the loan. This is useful, for example, when negotiating with a new, unfamiliar financial institution, an untested financial product, or when underwriting a large number of heterogeneous assets for which individual evaluation is not economically feasible.

In an embodiment, the specific asset for which the PBPC is utilized is small multi-family mortgages (sometimes referred to as "5-50 unit mortgages"). Thus, the present invention is now described in terms of multi-family mortgages. However, this is for convenience only and is not intended to limit the application of the present invention. In fact, after reading the following description, it will be apparent to one skilled in the relevant art(s) how to implement the following invention in alternative embodiments (e.g., where the underlying assets are not multi-family mortgages).

An institution seeking to provide a credit guarantee on these assets might tend to be excessively risk averse (e.g., due to a lack of data) and feel compelled to underwrite and physically inspect these assets individually. However, given the relatively small dollar amount of the loans secured by these assets, that level of review is unlikely to be feasible or economical on an individual asset basis. This is part of the reason why the U.S. Department of Housing and Urban Development (HUD) has identified this market as underserved.

In an embodiment, the present invention is of benefit for small multi-family mortgage assets because it is difficult to construct robust predictive models of small multi-family loans due to the lack of historical performance and the significant heterogeneity that exists among the underlying assets. However, despite this heterogeneity (which is greater than might be expected with single-family assets, i.e., single family homes) it would be possible to make reliable predictions of future asset performance based on a cumulative evaluation of actual realized performance on a specific pool of loans.

In alternate embodiments, the PBPC may be executed either through a mortgage-backed security, such as a Performance Certificate (PC), where the guarantee fee varies, or through a credit enhancement (of a bond or set of assets) where the credit enhancement fee (i.e., premium) varies. Additionally, when executed in the form of a security, the guarantee fee may vary in tandem with the security coupon (i.e., if the guarantee fee increases, then the coupon on the security decreases), or with the (excess) servicing fee that the servicer retains (i.e., in this case, the security coupon remains constant, but an increase in the guarantee fee results in a reduction in the servicing fee).

In alternate embodiments, features (or parameters) of the PBPC include:

(1) A base guarantee fee.

(2) A performance index—a raw measure of the performance of the underlying pool of assets (e.g., the quarter-end 60-day delinquency rate on the underlying pool).

(3) A performance measurement formula—a translation of the performance index into a pricing metric (e.g., this might entail a smoothing of the index to minimize volatility, such as would be accomplished by having the formula be the four-quarter moving average of the index).

(4) A permanent price adjustment formula (or grid)—this would be a specification of how the output of the performance measurement formula would be used to change permanently the guarantee fee of the contract (e.g., every percentage point by which the four-quarter moving average delinquency rate exceeds one percent results in an increase in the guarantee fee by 10 basis points).

(5) A temporary price adjustment formula (or grid)—a specification of how the performance measurement formula would be used to temporarily change the guarantee fee of the contract, where the formula would also specify the time period over which the change would remain in effect (e.g., every percentage point by which the four-quarter moving average delinquency rate exceeds one percent results in an increase in the guarantee fee by 25 basis points for one year, after which it decreases by 25 basis points).

(6) Maximum price levels—the maximum temporary and permanent guarantee fees allowed under the contract.

Establishing the above-listed exemplary parameters allows two counterparties to better structure credit transfers given uncertainty regarding expected losses and performance on the underlying assets. For example, a natural way that the preceding parameters might be set is in a way that forces the selling institution to pay to the guarantor the actuarially determined fair price for expected credit losses at the onset of the transaction while marking-to-market in real time the guarantee fee on the transaction on a predetermined schedule. Thus, the temporary price adjustment formula might be set to offset one-for-one any increase in expected losses that would be likely due to changes in the performance index, and the temporary price adjustment formula might be set to effectively re-price the transaction going forward based on the new information that has become available regarding the pool's actual performance.

The above-described structure also allows both parties to participate in well-defined types of risk sharing, while enabling them to better allocate responsibility for expected and unexpected (or catastrophic) losses. This may be seen in the following example:

If selling institution X believes it has AAA assets, then guarantor institution Y can accept that assertion with significantly less underwriting and analysis than might otherwise be required. Consequently, the base price is set at a level commensurate with AAA assets. If the assets perform as AAA assets, the guarantee fee never changes, and both institutions are satisfied with the transaction. If the assets begin to perform as BBB assets and losses appear imminent, the temporary guarantee fee would increase in anticipation of the realized losses, effectively transferring the cost of the loss back to institution X.

Furthermore, the loss profile now suggests that these were not AAA assets, but BBB assets, and the permanent guarantee fee now adjusts to the higher BBB price. Finally, if the asset performance deteriorates further due to catastrophic economic conditions, the maximum price level may be triggered and institution Y would at that point assume responsibility for catastrophic losses. Thus, by increasing the fees that it received for taking on risk during this term of the transaction, institution Y is able to avoid the risk associated with variations of asset performance over some moderate range in which detailed underwriting and historical analysis would be informative, but not cost effective. At the same time, institution Y is still able to assume a significant degree of catastrophic risk through the maximum price mechanism making the transaction possible for X. This structure mitigates the dual problems of adverse selection and moral hazard for heterogeneous assets with limited performance history, such as exists with small multi-family mortgages.

In sum, there has not been any product or security structures in the market that conveniently allow for varying guarantee fees. Spread or margin accounts—which are essentially credit loss reserve accounts created by cash flows from underlying assets—provide neither the flexibility of structures nor the embedded repricing capability that the PBPC provides. Further, a spread account does not provide the forward-looking adjustment that the PBPC provides, instead it only provides a buffer against expected losses.

Structuring Process

Referring to FIG. 1, a Performance-Based Participation (or Guarantee) Certificate structuring process 100 is shown according to an embodiment of the present invention.

In step 105, a pool of assets and a counterparty with whom to transact are identified.

In step 110, the mortgage attribute parameters are defined. The mortgage attribute parameters are measures of risk that may be objectively observed and which two parties should generally agree upon prior to establishing PBPC parameters. The mortgage attribute parameters are used to define the likely set of PBPC parameters that will achieve the objectives of both parties. If the mortgage attribute parameters indicate a very low-risk pool (i.e., very low average loan-to-value (LTV) ratios), this might suggest different PBPC parameters than a very high risk pool (i.e., one with very high average LTV ratios). The mortgage attribute parameters include: maturity, number of units, loan type, LTV ratios, geographic region, and other conventional mortgage attributes and measures of risk.

In step 113, the PBPC parameters are defined. The PBPC parameters are the basic parameters of the business deal between the two parties and include: a base guarantee fee, a performance index, a performance measurement, a permanent price adjustment, a temporary price adjustment, and minimum and maximum lifetime guarantee fees.

In step 115, it is decided how to secure future guarantee fee increases. In alternate embodiments, three options exist:

In a first embodiment, the coupon of the PC security may vary as the guarantee fee varies, and thus the interest payment to the security holder will vary as the guarantee fee varies.

In a second embodiment, the seller-servicer of the security may retain an excess servicing strip (i.e., an amount that is significantly in excess of the true economic cost of servicing the underlying assets). The weighted average coupon (WAC) of the mortgage assets must provide for all payments to investors (e.g., the pass-thru rate $R_t$, the guarantee fee $G_t$ and the servicing fee $S_t$). Thus, except in the case where there is a third party guarantor, WAC=$R_t$+$G_t$+$S_t$. Because WAC does not change over time, if the $G_t$ changes over time (based on performance) either $S_t$ or $R_t$ must increase/decrease one-for-one. Securing the base guarantee fee with servicing implies that the increases in the $G_t$ will result in one-for-one reduction in $S_t$.

Because the expectation is that $S_t$ may decline (it is normally set relatively low) it must be set high enough to be able to absorb those reductions. This is "excess servicing" from which future increases in the $G_t$ will be obtained if needed. This excess servicing strip thus may secure future guarantee fee increases, with an increase in the guarantee fee resulting in a reduction in the excess servicing received by the servicer.

In a third embodiment, the future guarantee fees may be secured by a corporate guarantee from the servicer, or any other guarantor.

In step 120, once the PBPC parameters are defined, the security is issued, and then sold or swapped with the parameters clearly articulated in the offering circular.

In step 125, once the security is issued, the performance index is calculated each period according to the details set forth in the offering circular. Based on the outcome of this calculation, the guarantee fee must be reset each period, and either the security coupon or the servicing strip will vary, or the counterparty (or its guarantor) may be called upon to pay additional guarantee fees, or may receive a guarantee rebate.

Parameter Definitions

Figure 2:
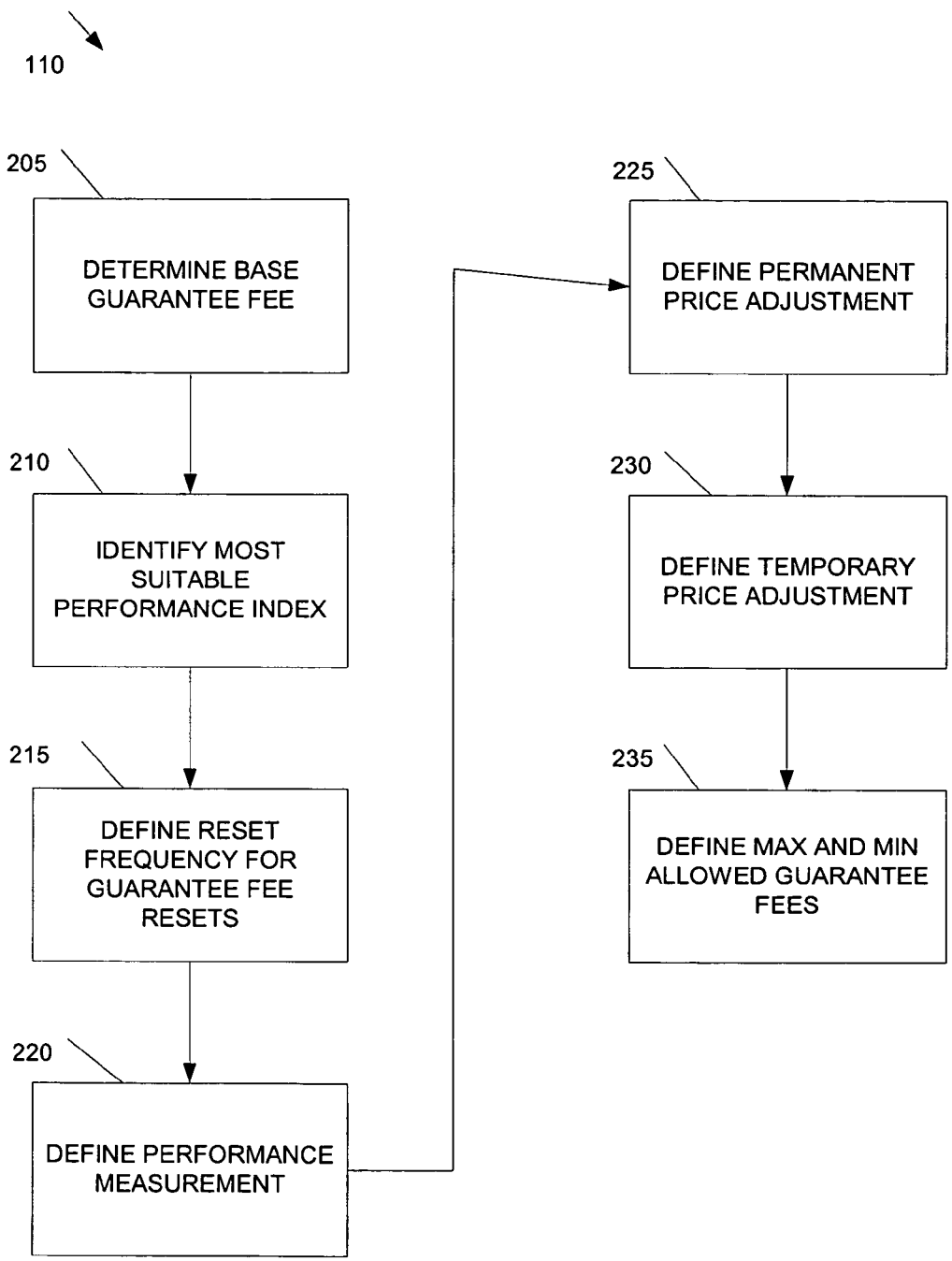
FIG. 2 is a flowchart illustrating an asset parameter definition process according to an embodiment of the present invention.

FIG. 2 is a flowchart illustrating a mortgage attribute parameter definition process 110 (of process 100) for the underlying assets, according to one embodiment of the present invention.

In step 205, the base guarantee fee (i.e., $G_0$) is determined. The base guarantee fee is based on the lowest guarantee fee (i.e., the lowest price) currently charged for assets of a certain type and risk profile. In the example below, the base guarantee fee is set to 20 basis points. The guarantee fee in period t is denoted as $G_t$.

In step 210, the most suitable performance index is identified. The performance index is used to assess performance and adjust the guarantee fee. The purpose of the performance index is to allow the PBPC to adjust the guarantee fee to reflect both realized losses, and revised expectations regarding future losses. Thus, the performance index should be a reliable, transparent, industry-standard measure of credit risk. That is, in an embodiment, the performance index should measure the performance of the underlying assets and be correlated with risk and expected losses so that it is a reasonable standard of how well or poorly the underlying assets are performing. In alternate embodiments, the performance index can be a 30-day, 60-day, or 90-day delinquency rate, or any other publicly observable index that is correlated with credit risk (e.g., a published house price index.) The performance index in period t is denoted as $PI_t$.

In step 215, a reset frequency for guarantee fee resets is defined. In alternate embodiments, the reset frequency can be annual, semi-annual, or quarterly. In the current example, the reset frequency is defined as an annual reset frequency. It should be noted that the reset frequency can be set to be triggered by other events, such as a particular movement in the performance index, instead of, or in addition to, a calendar-based reset cycle. In this way, for example, if the performance index exceeds a certain value, the reset frequency could change from annual to quarterly.

In step 220, the performance measurement is defined. The performance measurement, denoted as $PM_t$, is the result of a formula (the performance measurement formula) where the sole variable is the performance index measured at different points in time. The result of this formula is the performance measurement for each measurement interval. The measurement interval may be quarterly, semi-annual, or annual. An example of a performance measurement would be the average value of the performance indicator at each of the past four quarter-end dates over the past year, rounded up to the nearest whole percentage point, divided by one percent, and subtracted by 1. Thus, if the delinquency rates for the past four quarters were: 1%, 1.8%, 2%, and 4%, the average is 2.2%. 2.2%, when rounded up to the nearest whole percentage point, is 3%. Dividing 3% by 1% yields the value 3. Subtracting 1 from 3 yields 2. The calculation for $PM_t$, using the above example values, can be summarized as follows:

$$PM_t = \text{Roundup}[(PI_t+PI_{t-1}+PI_{t-2}+PI_{t-3})/4]*[1/0.01]-1$$

$$PM_t = \text{Roundup}[(0.01+0.018+0.02+0.04)/4]*[1/0.02]-1$$

$$PM_t = (0.03/0.01)-1$$

$$PM_t = 3-1 = 2$$

In step 225, the permanent price adjustment is defined. The permanent price adjustment formula translates or maps the performance measure into an adjustment of the guarantee fee. The result of this formula is referred to as the permanent price adjustment factor. The permanent price adjustment factor is a number (e.g., 10 basis points), and the permanent price adjustment formula is a function of the maximum performance measure experienced to date. Thus, the permanent price adjustment is:

$$PPA_t = \text{Max}(PPA_{t-1}, PM_t*PPAF)$$

where $PPA_{t-1}$ is a previous permanent price adjustment, $PM_t$ is a current performance measurement, and PPAF is a permanent price adjustment factor.

As an example, if the $PM_t$ is 2, the PPAF is 10, and the $PPA_{t-1}$ is 0 (for this example, we will exclude the temporary price adjustment factor), the permanent price adjustment $PPA_t$=Max ($PPA_{t-1}$, $PM_t$*PPAF)=Max (0, 2*10)=Max (0, 20)=20. If the guarantee fee in the previous period $G_{t-1}$ (the base period $G_0$) was 20, the bound Min G was 0, and the bound Max G was 200, the guarantee fee $G_t$ of the current period would be: $G_t$=Min [Max ($G_0$+$PPA_t$+$TPA_t$, MinG), Max G]=Min [Max (20+20+0, 0), 200]=Min [Max (40, 0), 200]=Min [40,200]=40. It should be noted that the permanent price adjustment factor PPAT may result in either a reduction to or an increase in the guarantee fee.

In step 230, the temporary price adjustment factor is defined. The temporary price adjustment formula translates or maps the performance measure into an adjustment of the guarantee fee. This adjustment is in addition to the permanent price adjustment. Because it is temporary, the temporary price adjustment also requires that the time period over which the temporary adjustment is effective be specified. After that period of time, it reverts to zero unless a subsequent temporary adjustment is triggered. Thus, the temporary price adjustment is:

$$TPA_t = PM_t * TPAF$$

where $PM_t$ is a current performance measurement, and TPAF is a temporary price adjustment factor.

An example of a temporary price adjustment is 25 basis points as the temporary price adjustment factor multiplied by the performance measurement in the current time period. Thus, in the example above, where the performance measurement is 2, the temporary price adjustment factor is 25, and the temporary price adjustment is thus 2*25=50. Adding this to the value above of 40 would result in a guarantee fee of 90 basis points (i.e., 50+40=90). However, in the second period, if the performance measurement is 1 (instead of 2), the temporary price adjustment would be 1*25=25. In this case, the guarantee fee would decline to 65 basis points (40+25=65).

In step 235, the maximum and minimum allowed guarantee fees are defined. These maximum and minimum amounts are lifetime limits on the guarantee fee, and are denoted as Max G and Min G.

In the following example, it is assumed that the base guarantee fee $G_0$ is 25, the minimum guarantee fee is 20, and the maximum guarantee fee is 100. Also, the permanent price adjustment (PPA) and the temporary price adjustment (TPA) need to be determined. The PPA is determined, where the performance measurement $PM_t$ is 2, the PPAF is set at 10, and the $PPA_{t-1}$ is set at 0, as follows:

$$PPA_t = Max(PPA_{t-1}, PM_t * PPAF)$$

$$PPA_t = Max(0, 2*10)$$

$$PPA_t = Max(0, 20)$$

$$PPA_t = 20 \text{ basis points}$$

Similarly, the temporary price adjustment (TPA) is determined, where the performance index $PI_t$ is 2 and the TPAF is set at 25, as follows:

$$TPA_t = PI_t * TPAF$$

$$TPA_t = 2*25$$

$$TPA_t = 50 \text{ basis points}$$

Thus, with the PPA, at 20, the TPA, at 50, the base guarantee fee is 25 basis points, and the performance index $PI_t$ is 2, the following formula is used to determine $G_t$:

$$G_t = Min[Max(G_0 + PPA_t + TPA_t, MinG), MaxG]$$

$$G_t = Min[Max(25+20+50, 20), 100]$$

$$G_t = Min[Max(95, 20), 100]$$

$$G_t = Min[95, 100]$$

$$G_t = 95 \text{ basis points}$$

Example Implementations

The present invention (process 100 or any part(s) or function(s) thereof) may be implemented using hardware, software or a combination thereof and may be implemented in one or more computer systems or other processing systems. However, the manipulations performed by the present invention were often referred to in terms, such as adding or comparing, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 3:
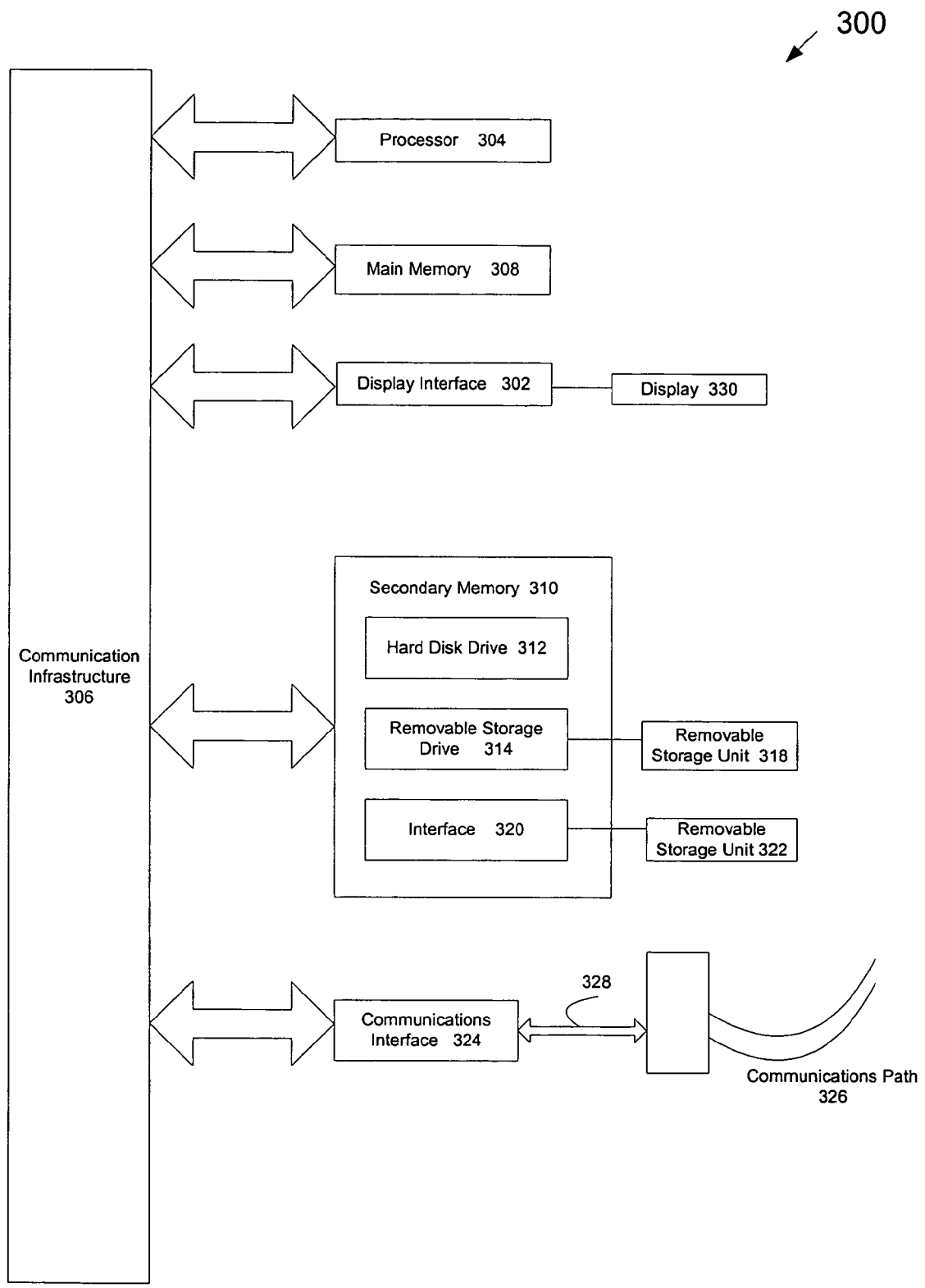
FIG. 3 is a block diagram of an exemplary computer system useful for implementing the present invention.

In fact, in one embodiment, the invention is directed toward one or more computer systems capable of carrying out the functionality described herein. An example of a computer system 300 is shown in FIG. 3.

The computer system 300 includes one or more processors, such as processor 304. The processor 304 is connected to a communication infrastructure 306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc., which is read by and written to by removable storage drive 314. As will be appreciated, the removable storage unit 318 includes a computer usable storage medium having stored therein computer software and/or data.

In alternative embodiments, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip, such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328 which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 314, a hard disk installed in hard disk drive 312, and signals 328. These computer program products provide software to computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

CONCLUSION

The present invention is described in terms of the above embodiments. This is for convenience only and is not intended to limit the application of the present invention. In fact, after reading the description of the present invention, it will be apparent to one skilled in the relevant arts how to implement the present invention in alternative embodiments.

In addition, it should be understood that the Figures described above, which highlight the functionality and advantages of the present invention, are presented for example purposes only. The architecture of the present invention is sufficiently flexible and configurable, such that it may be utilized in ways other than that shown in the Figures.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of structuring a performance-based participation certificate contract, comprising the steps of:
   identifying a pool of assets;
   identifying parameters for the assets;
   establishing a base guarantee fee for a security;
   identifying a manner of securing the base guarantee fee for the contract;
   issuing the security reflecting the parameters of the assets;
   determining, using a computer, performance of the assets using a performance index;
   calculating, using the computer after issuing the security, a second guarantee fee based on the determined performance of the assets and based on the base guarantee fee; and
   resetting the base guarantee fee for the security with the second guarantee fee, based on realized performance of the assets, once every predetermined time period.

2. The method of claim 1, wherein the guarantee fee $G_t$ is defined as:

$$G_t = \mathrm{Min}[\mathrm{Max}(G_0 + PPA_t + TPA_t, \mathrm{Min}G), \mathrm{Max}G]$$

and is based on the following parameters:
the base guarantee fee $G_0$;
a permanent price adjustment $PPA_t$ dependent on the performance index;
a temporary price adjustment $TPA_t$ dependent on the performance index; and
a maximum lifetime guarantee fee MaxG and a minimum lifetime guarantee fee MinG.

3. The method of claim 2, wherein the base guarantee fee is based on the lowest guarantee fee currently charged for the assets.

4. The method of claim 1, wherein the performance index is any publicly observable index that is correlated with credit risk.

5. The method of claim 2, wherein the price reset frequency is one of a group consisting of:
   an annual reset;
   a semi-annual reset; and
   a quarterly reset.

6. The method of claim 2, wherein the performance measurement $PM_t$ is defined as:

$$PM_t = \mathrm{Roundup}[(PI_t + PI_{t-1} + PI_{t-2} + PI_{t-3})/4]*[1/0.01]-1;$$

wherein $PI_t$, $PI_{t-1}$, $PI_{t-2}$, and $PI_{t-3}$ are performance indexes measured at different points in time.

7. The method of claim 2, further including calculating a permanent price adjustment $PPA_t$ as:

$$PPA_t = \mathrm{Max}(PPA_{t-1}, PM_t*PPAF);$$

wherein $PPA_{t-1}$ is a previous permanent price adjustment, $PM_t$ is a current performance measurement, and PPAF is a permanent price adjustment factor.

8. The method of claim 2, wherein the temporary price adjustment $TPA_t$ is defined as:

$$TPA_t = PM_t*TPAF;$$

wherein $PM_t$ is a current performance measurement and TPAF is a temporary price adjustment factor.

9. The method of claim 2, wherein the maximum and the minimum lifetime guarantee fees are lifetime limits on the guarantee fee.

10. The method of claim 1, wherein the assets are multi-family mortgages.

11. The method of claim 1, further comprising:
    providing a guarantor with reimbursement for a predetermined amount of initial loss on the performance-based certificate contract.

12. A method of structuring a performance-based participation certificate contract, comprising the steps of:
    identifying a pool of assets;
    identifying parameters for the assets;
    establishing a guarantee fee for a security;
    identifying a manner of securing the guarantee fee for the contract;
    issuing the security reflecting the parameters of the assets;
    resetting the guarantee fee for the security using a computer, based on realized performance of the assets, once every predetermined time period wherein the manner of securing one or more future guarantee fee increases comprises at least one of a group consisting of:

varying an interest payment to a security holder as a guarantee fee varies, after issuing the security;

retaining an excess servicing strip, after issuing the security; and securing future guarantee fees with a corporate guarantee, after issuing the security.

13. A computer usable medium comprising instructions which, when executed by a processor, cause a computer to structure a performance-based participation certificate contract, said instructions comprising:

first computer readable program code means for causing the computer to identify a pool of assets;

second computer readable program code means for causing the computer to identify parameters for the assets;

third computer readable program code means for establishing a base guarantee fee for a security;

fourth computer readable program code means for causing the computer to identify a manner of securing the base guarantee fee for the contract;

fifth computer readable program code means for causing the computer to issue the security reflecting the parameters of the assets;

sixth computer readable program code means for determining performance of the assets using a performance index;

seventh computer readable program means for calculating, after issuing the security, a second guarantee fee based on the determined performance of the assets and based on the base guarantee fee; and eighth computer readable program code means for causing the computer to reset the base guarantee fee with the second guarantee fee, based on realized performance of the assets, once every predetermined time period.

14. The computer usable medium of claim 13, wherein the guarantee fee $G_t$ is defined as:

$$G_t = \mathrm{Min}[\mathrm{Max}(G_0 + PPA_t + TPA_t, \mathrm{Min}G), \mathrm{Max}G]$$

and is based on the following parameters:

the base guarantee fee $G_0$;

a permanent price adjustment $PPA_t$ dependent on the performance index;

a temporary price adjustment $TPA_t$ dependent on the performance index; and a maximum lifetime guarantee fee MaxG and a minimum lifetime guarantee fee MinG.

15. The computer usable medium of claim 14, wherein the base guarantee fee is based on the lowest guarantee fee currently charged for the assets.

16. The computer usable medium of claim 13, wherein the performance index is any publicly observable index that is correlated with credit risk.

17. The computer usable medium of claim 14, wherein the price reset frequency is one of a group consisting of:

an annual reset;

a semi-annual reset; and a quarterly reset.

18. The computer usable medium of claim 14, further including calculating a performance measurement $PM_t$ as:

$$PM_t = \mathrm{Roundup}[(PI_t + PI_{t-1} + PI_{t-2} + PI_{t-3})/4]*[1/0.01] - 1;$$

wherein $PI_t$, $PI_{t-1}$, $PI_{t-2}$, and $PI_{t-3}$ are performance indexes measured at different points in time.

19. The computer usable medium of claim 14, wherein the permanent price adjustment $PPA_t$ is defined as:

$$PPA_t = \mathrm{Max}(PPA_{t-1}, PM_t * PPAF);$$

wherein $PPA_{t-1}$, is a previous permanent price adjustment, $PM_t$ is a current performance measurement, and PPAF is a permanent price adjustment factor.

20. The computer usable medium program product of claim 14, wherein the temporary price adjustment $TPA_t$ is defined as:

$$TPA_t = PM_t * TPAF;$$

wherein $PM_t$ is a current performance measurement and TPAF is a temporary price adjustment factor.

21. The computer usable medium of claim 14, wherein the maximum and the minimum lifetime guarantee fees are lifetime limits on the guarantee fee.

22. A computer usable medium comprising instructions which, when executed by a processor, cause a computer to structure a performance-based participation certificate contract, said instructions comprising:

first computer readable program code means for causing the computer to identify a pool of assets;

second computer readable program code means for causing the computer to identify parameters for the assets;

third computer readable program code means for establishing a guarantee fee for a security;

fourth computer readable program code means for causing the computer to identify a manner of securing the guarantee fee for the contract;

fifth computer readable program code means for causing the computer to issue the security reflecting the parameters of the assets;

sixth computer readable program code means for causing the computer to reset the guarantee fee, based on realized performance of the assets, once every predetermined time period, wherein the manner of securing one or more future guarantee fee increases is one of a group consisting of:

varying an interest payment to a security holder as a guarantee fee varies, after issuing the securing;

retaining an excess servicing strip, after issuing the security; and securing future guarantee fees with a corporate guarantee, after issuing the security.

23. The computer usable medium of claim 13, wherein the assets are multi-family mortgages.

24. A method of structuring a credit enhancement contract, comprising the steps of:

identifying a pool of assets;

identifying parameters for the assets;

establishing a base credit enhancement fee for a security;

identifying a manner of securing the base credit enhancement fee for the credit enhancement contract;

issuing the security reflecting the parameters of the assets;

determining, using a computer, a performance of the assets using a performance index;

calculating, using the computer after issuing the assets, a second credit enhancement fee based on the determined performance of the assets and based on the base credit enhancement fee; and resetting the base credit enhancement fee for the security with the second credit enhancement fee, based on realized performance of the assets, once every predetermined time period.

25. The method of claim 24, wherein the credit enhancement fee is a guarantee fee.

* * * * *